Patented Mar. 2, 1943

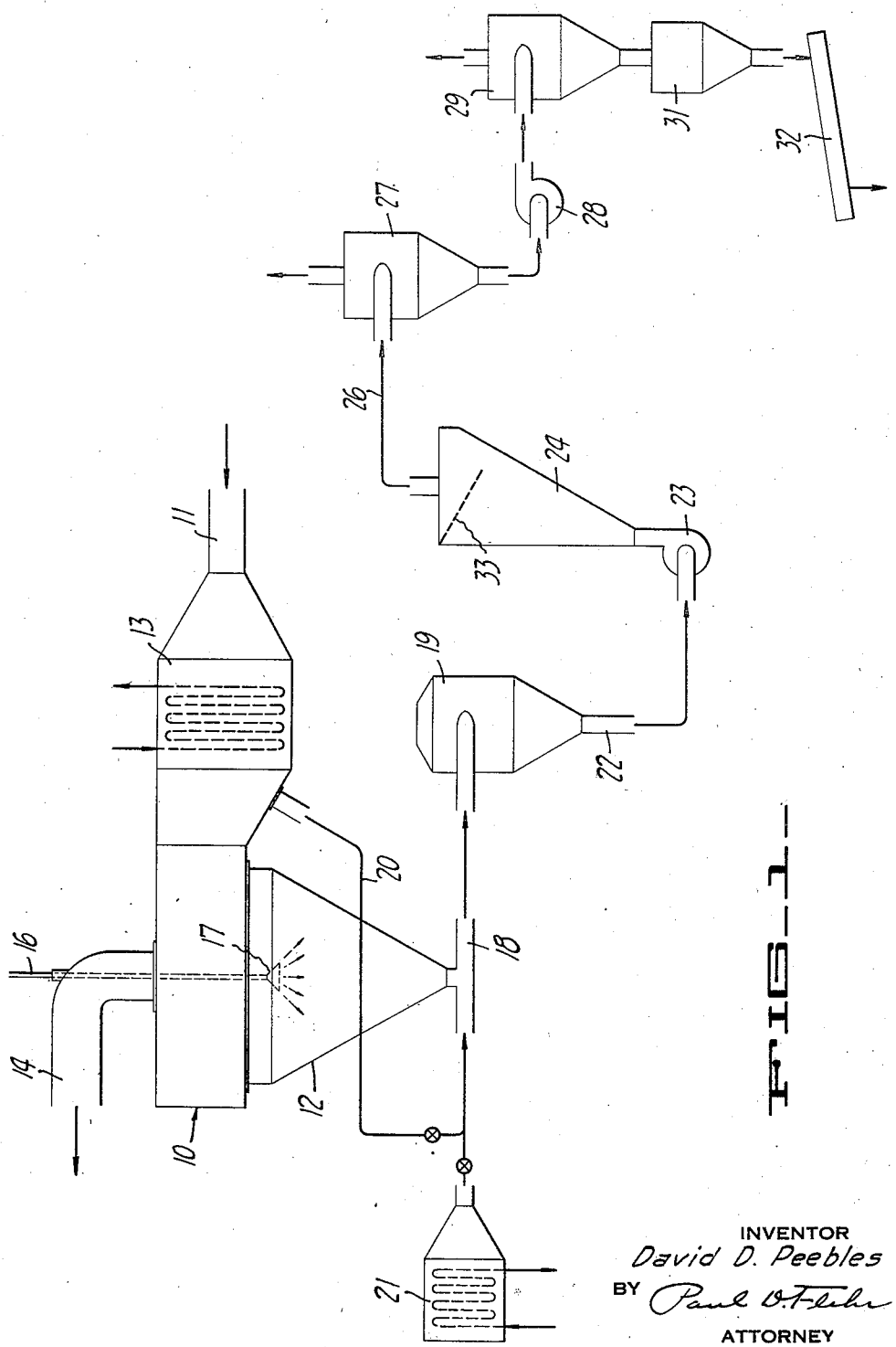

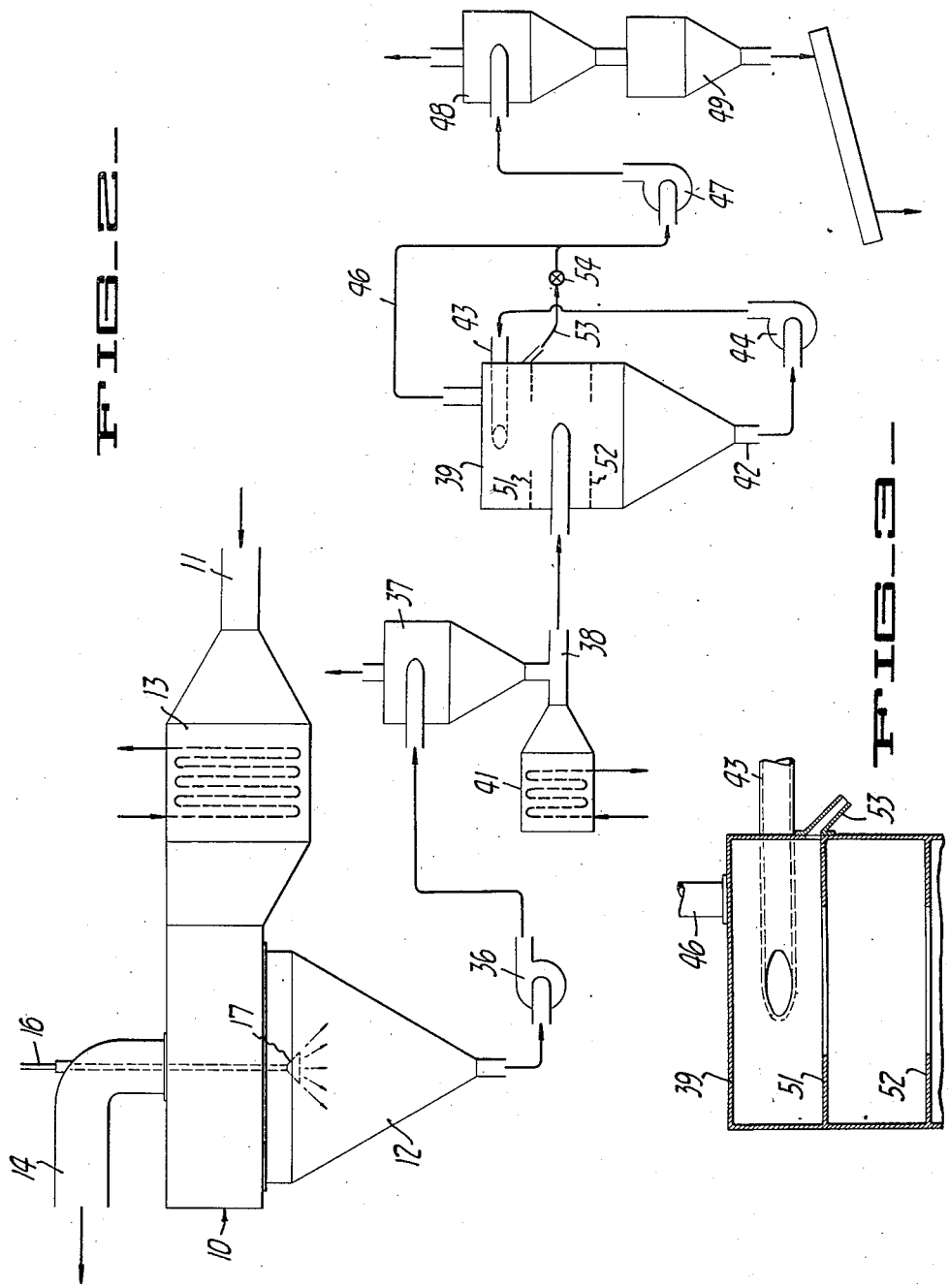

2,312,474

UNITED STATES PATENT OFFICE 2,312,474

DRYING METHOD

David D. Peebles, Berkeley, Calif., assignor to Golden State Company, Ltd., San Francisco, Calif., a corporation of Delaware Application October 10, 1939, Serial No. 298,795

12 Claims. (Cl. 159—48)

This invention relates generally to methods for converting various materials in liquid form to dry, powdered products. It is particularly applicable to materials containing protein susceptible to coagulation by heating, as for example skim milk or like milk products.

In the manufacture of dried milk products, as for example powdered skim milk, it is customary practice to make use of spray drying equipment such as equipment of the Gray-Jensen type (see Hunzicker's Condensed Milk and Milk Powder, published 1934, 5th edition). While installations of such equipment give satisfactory results within the limits of capacity for which they were originally designed, attempts to operate at an increased capacity, as for example by increasing the percentage of solids in the material supplied to the spray drying chamber and by increasing the exhaust temperature of the drying gas, result in a dried material of seriously impaired quality. Solubility of the material is impaired, and there is a noticeable tendency toward discoloration. I have found that the impairment in solubility is due to increased coagulation of milk proteins, which are known to be susceptible to coagulation by heating.

The present invention has for its object the provision of an apparatus and method capable of operation at relatively high capacity for a given size of spray drying chamber, with the production of a high quality product. The invention is characterized by the use of a plurality of drying zones in which the material being dried is suspended in drying gas, with the drying being carried out in two or more stages in such manner as to avoid coagulation of milk protein or impairment of color.

Further objects of the invention will appear from the following description in which the preferred embodiments have been set forth in detail in conjunction with the accompanying drawings.

Referring to the drawings—

Fig. 1 illustrates diagrammatically apparatus for carrying out the present invention.

Fig. 2 illustrates another form of apparatus for carrying out the invention.

Fig. 3 is a detail illustrating the construction of a portion of the equipment shown in Fig. 2.

Referring first to Fig. 1, the equipment illustrated includes a spray drier 10, which in this instance is of the Gray-Jensen type, although other types of spray drying equipment can be employed. Here the drying gas is delivered from the discharge side of the blower through the conduit 11 into the upper portion of the drying chamber 12. The heater 13 serves to elevate the temperature of the drying gas to the temperature level desired. Gas is discharged from chamber 12 through conduit 14. The liquid material being desiccated is introduced through pipe 16, and atomized by the spray nozzle 17. As is well known to those skilled in the art, the hot drying gas is introduced tangentially into the desiccating chamber, whereby the gas within the chamber swirls about a vertical axis, with entrainment of the atomized particles in the gas. In the ordinary use of such apparatus the lower conical end of the drying chamber is connected to a conduit for the removal of the dried material.

In carrying out the present invention, the material delivered into the spray drying apparatus 10 is treated in additional apparatus for further removal of moisture content. Also, the initial drying step carried out by the spray drier 10 is operated at a greatly increased capacity and in such a manner that the material is converted to solid form short of complete moisture removal, and without substantial coagulation of milk protein. Treatment by the additional apparatus subjects the material to the action of a drying gas in one or more additional drying zones, to effect rapid removal of remaining moisture without coagulation of proteins or impairment of color.

Referring again to Fig. 1, the lower end of the chamber 12 is shown connected to a conduit 18, which in turn connects to a secondary drying chamber 19. The inlet end of conduit 18 is supplied with hot gas from a suitable source, as for example by way of conduit 20 which leads to the discharge side of heater 13, or by way of a supplemental air heater 21. Gas is withdrawn from chamber 19 through conduit 22 and delivered by blower 23 to the classifying apparatus 24. Conduit 26 withdraws the classified material and delivers it to a cyclone separator 27. Blower 28 withdraws the material from separator 27 and delivers it to another cyclone 29. The collected material from cyclone 29 can be withdrawn into a collecting hopper 31, and passed through a sifting apparatus 32 to form a final finished material.

While the form of the drying chamber 19 may vary, in this instance it is a relatively simple cylindrical shaped chamber having conduit 18 connected tangentially through one side wall, whereby gaseous material within the chamber swirls about the central axis at relatively high velocities. Classifier 24 can be formed generally as indicated, with an internal baffle wall 33 interposed across the region of the outlet opening. Coarser material discharged by blower 23 impacts with baffle 33, whereby such material is prevented from passing out through conduit 26 with the finer sized material. In time impacting of the coarser material upon baffle 33 breaks this material into finer particles for discharge.

In carrying out the present method by use of the apparatus shown in Fig. 1, gas delivered into the chamber 19 together with the material withdrawn from chamber 12 must have a relative humidity substantially less than the relative humidity of the gas being withdrawn from the desiccating chamber 12. In the present instance, this is accomplished by the fact that that portion of the gas withdrawn from the desiccating chamber 12 together with the particles of partially dried material, is intermixed in conduit 18 with hot drying gas of low relative humidity supplied through conduit 20 or heater 21. Within chamber 19 further evaporation takes place at a rapid rate to convert the material to an anhydrous product, and the drying within this chamber takes place under such conditions that milk proteins are not coagulated to any substantial degree, nor the color impaired.

By way of example, the gas upon leaving the heater 13 and as introduced into the desiccating chamber 12, may be at a temperature of about 260° Fahrenheit. The temperature at which the moist gas is exhausted from chamber 12 through conduit 14 can be about 170° Fahrenheit. That portion of the gas being withdrawn from the lower end of chamber 12 together with the material being dried will be at substantially the same temperature as the gas discharged from conduit 14, that is about 170° Fahrenheit. Hot gas supplied to conduit 18 by way of conduit 20 or heater 21 can be about 220° Fahrenheit. For the temperatures of operation specified, the temperature of the gas leaving classifier 24 will be about 150° Fahrenheit, and should not be saturated with moisture. The moisture content of the material withdrawn from the desiccating chamber 12 can range from about 4 to 10%, while that of the finished product may range from 0.5 to 3%, as desired.

A particular feature of my method is that a spray drying apparatus 12 of a given size can be operated at relatively high capacity, with production of a high quality product. In this connection it may be noted that equipment of the Gray-Jensen type as operated in the past is supplied with a concentrated material such as skim milk, whereas the present process makes possible preconcentration of the material as by vacuum evaporation. Thus in applying the process to skim milk, the milk is concentrated by evaporation to the extent of from say 30 to 50% solids, about 35% being customary, whereby the effective capacity of the spray drier is greatly increased. When operating at high capacity according to the present method, the protein content of the moist material withdrawn from chamber 12 is not coagulated, since all of the drying takes place at a rapid rate.

In the secondary chamber 19, conditions are such as to promote further moisture removal at a relatively rapid rate, because of the low relative humidity of the gas, and also because there is more turbulence and higher velocities of gas flow and better contact within chamber 19 than in chamber 12. Rapid moisture removal prevents any substantial degree of protein coagulation, since evaporation of moisture from the particles keeps the particles within a temperature range at which little if any coagulation takes place, while at the same time producing a relatively anhydrous product. The removal of the final moisture protects the particles against the heat of the drying gas, whereby this stage of the drying is carried out without substantial coagulation of the milk protein.

In the embodiment of Fig. 2 the secondary drying and classification of the material is carried out by the use of a single piece of equipment. Blower 36 is shown receiving material from desiccating chamber 12, together with the desired proportion of exhaust gas, and this material is delivered to the cyclone separator 37. From the cyclone 37 the material is delivered to conduit 38 which connects tangentially with a secondary drying chamber 39. Conduit 38 receives hot dry gas from the heater 41. Chamber 39 also connects with conduits 42 and 43, which together with the external blower 44, form a recirculating path for gas and material being dried. Conduit 46 withdraws gas and dried material from chamber 39 and is shown connected to blower 47, which in turn connects with the cyclone separator 48 and collecting hopper 49.

Chamber 39 is preferably cylindrical or circular in contour, and to afford a classifying action, its interior is provided with the annular shelves 51 and 52. Conduit 38 connects with the chamber at a level between these shelves, while the return conduit 43 connects tangentially above the shelf 51. The point of connection of conduit 46 through the top wall of the chamber is offset laterally from the central axis. Conduit 53 connects at a level above shelf 51 and can be used to intermittently or continuously bleed off material collecting above this shelf, by controlling valves or damper 54.

In general, the apparatus of Fig. 2 operates as described above for Fig. 1. Cyclone separator 37 serves to exhaust some of the moist warm air withdrawn with the material from desiccating chamber 12. Upon leaving the separator 37 the material is entrained with the hot drying gas from heater 41, and delivered with this dry gas into the chamber 39. Within chamber 39 the material is entrained by the swirling drying gas and the effective period of retention of the material with the drying gas is prolonged by virtue of recirculation through blower 44. The shelves 51 and 52 cause the apparatus to function as a classifier, to effectively retain coarser material with discharge of only the finer material through the conduit 46. The coarser material is in time pulverized and likewise delivered to conduit 46.

I claim:

1. In a method of drying liquid material containing protein susceptible to coagulation by heating, the steps of maintaining two zones of drying gas by continuous introduction of hot gas into and removal of gas from each zone, spraying the material into one zone whereby evolution of moisture converts the material into solid particles without coagulation of protein, and then causing the particles to progress without rest into the second zone with suspension of the particles in the gas maintained in said second zone for further removal of moisture content to form an anhydrous product substantially free of combined moisture, the gas introduced into the second zone having a relative humidity substantially less than that of the gas discharged from the first zone.

2. In a method of drying liquid material containing protein susceptible to coagulation by heating, the steps of maintaining at least two zones of drying gas by continuous introduction of hot gas into and removal of gas from each zone, spraying the material into one zone with suspension of the particles in the drying gas whereby evolution of moisture converts the material into moist but solid particles without coagulation of protein, and then causing the particles to progress in a stream of gas without rest into the second zone with suspension of the particles in the gas maintained in said second zone for further removal of moisture content to form an anhydrous product substantially free of combined moisture, the gas introduced into the second zone having a relative humidity substantially less than the relative humidity of the gas discharged from the first zone.

3. In a method of drying liquid material containing protein susceptible to coagulation by heating, the steps of maintaining primary and secondary zones of drying gas by continuous introduction of hot gas into and removal of gas from each zone, spraying the material into the primary zone with suspension of the particles in the drying gas whereby evolution of moisture from the particles converts the same into solid form without substantial coagulation of protein, conveying the particles without rest from the primary to the secondary zone with suspension of the particles in the gas maintained in the secondary zone, whereby further moisture removal occurs in the secondary zone to convert the material to dry form, the gas introduced into the secondary zone having a relative humidity substantially less than that of the gas discharged from the first zone.

4. In a method of drying milk products like skim milk, concentrating the milk product by evaporation, maintaining a plurality of zones of drying gas by continuous introduction of hot gas into and removal of gas from each zone, spraying the concentrate into one zone whereby evolution of moisture from the particles converts the material into moist but solid particles without coagulation of protein, immediately causing the particles to progress without rest into a subsequent drying zone with suspension of the particles in the gas maintained in said subsequent zone for further rapid removal of moisture content to form an anhydrous material having substantially no combined moisture, the gas introduced into the second zone having a relative humidity substantially less than that of the gas discharged from the first zone.

5. In a method of drying liquid material containing protein susceptible to coagulation by heating, the steps of maintaining a plurality of zones of drying gas by continuous introduction of hot gas into and removal of gas from each zone, spraying the material into one zone whereby material is placed in suspension with the drying gas and whereby evolution of moisture converts the material into moist but solid particles without substantial coagulation of protein, removing the particles from the first named zone together with a portion of the drying gas, causing the particles to progress without rest from said first zone into a second drying zone with suspension of the particles in the gas maintained in said second zone for further removal of moisture content to form a dry product containing not more than about 3% moisture, the gas introduced into the second named zone having a relative humidity substantially less than the relative humidity of the gas removed from the first named zone together with the material, and then collecting the dry material.

6. In a method of drying liquid material containing protein susceptible to coagulation by heating, the steps of maintaining at least two zones of moving drying gas by continuous introduction of hot gas into and removal of gas from each zone, spraying the material into one zone whereby the material is suspended in the drying gas with evolution of moisture to convert the material into moist but solid particles without substantial coagulation of protein, and then causing the particles to progress without rest into the second zone with suspension of the particles in the gas maintained in said second zone for further removal of moisture content to form a dry product, the gas introduced into the second zone having a relative humidity substantially less than that of the gas discharged from the first zone, and the velocity of movement of the gas in the second zone being substantially greater than that of the first zone.

7. In a method for the manufacture of a dry product from a liquid material, containing one or more components susceptible to coagulation by heat, the steps of removing water from the material at a rate sufficient to keep the material at a temperature below that causing coagulation of said components, by spraying the material into a hot drying gas of low relative humidity, whereby the material is converted to moist but solid divided form, and then transferring the material without rest to a second hot drying zone and suspending the particles of said material in a drying gas in said second zone for effecting removal of moisture in the second zone to a value not more than about 3% and at a rate sufficiently rapid to maintain the particles at a temperature below that which causes coagulation of said components.

8. In a method of drying liquid material containing solids, the steps of maintaining at least two zones of drying gas by continuous introduction of hot gas into and removal of gas from each zone, the gas in each zone being in continual motion, spraying the material into one zone whereby the material is suspended in the drying gas with evolution of moisture to convert the material into moist but solid particles, and then causing the particles to progress without rest into the second zone with suspension of the particles in the gas maintained in said second zone for further removal of moisture to form a dry product, the gas introduced into the second zone having a relative humidity substantially less than that of the gas discharged from the first zone, and the velocity of movement of the gas in the second zone being substantially greater than that of the first zone.

9. In a method of drying liquid material containing proteins susceptible to coagulation by heating, the steps of maintaining primary and secondary zones of drying gas by continuous introduction of hot drying gas into and removal of gas from each zone, spraying the material into the primary zone with suspension of the particles in the drying gas whereby evolution of moisture from the particles converts the same to solid form without substantial coagulation of protein, conveying the particles in a stream of gas without rest from the primary to the secondary zone, causing the particles to be suspended in the gas maintained in the secondary zone, whereby further moisture removal occurs in the secondary zone to convert the material to dry form, the gas introduced into the secondary zone having a relative humidity substantially less than that of the gas discharged from the first zone.

10. In a method of drying liquid material containing protein susceptible to coagulation by heating, the steps of maintaining a plurality of zones of drying gas by continuous introduction of hot gas into and removal of gas from each zone, spraying the material into one zone whereby particles of the material are suspended in the drying gas to cause evolution of moisture whereby the material is converted into solid particles without substantial coagulation of protein, causing the solid particles to progress from said one zone into another drying zone for further removal of moisture content to form a dry product, the gas introduced into the last named zone having a relative humidity substantially less than that of the gas discharged from the first named zone, removing finely divided dry material from the last drying zone, and causing coarser particles of the material in said last named zone to be reduced to finer particle size for removal by continually agitating and impacting the same.

11. In a method of drying liquid material containing protein susceptible to coagulation by heating, the steps of maintaining two zones of drying gas by continuous introduction of hot gas into and removal of gas from each zone, spraying the material into a first drying zone whereby evolution of moisture converts the material into moist but solid particles without substantial coagulation of protein, causing the particles to immediately progress without rest from the first zone to the second zone with suspension of the particles in the gas maintained in the secondary zone for further removal of moisture content to form a dry product, the gas introduced into the second zone having a relative humidity substantially less than that of the gas discharged from the first zone, and continuously recirculating drying gas through the second zone by way of a circulating path external of the zone to cause a velocity of movement of gas in the second zone which is greater than the velocity of movement of drying gas in the first zone.

12. In a method of drying liquid material containing proteins susceptible to coagulation by heating, the steps of maintaining primary and secondary zones of drying gas by continuous introduction of hot drying gas into and removal of gas from each zone, spraying the material into the primary zone with suspension of the particles in the drying gas whereby evolution of moisture from the particles converts the same to solid form without substantial coagulation of protein, conveying the particles in a stream of gas without rest from the primary to the secondary zone, causing the particles to be suspended in the gas maintained in the secondary zone, the gas flow in the secondary zone being at higher velocities than in the primary zone, whereby further rapid moisture removal occurs in the secondary zone to convert the material to dry form, the gas introduced into the secondary zone having a relative humidity substantially less than that of the gas discharged from the first zone.

DAVID D. PEEBLES.